G. C. GORDON.
METHOD OF MAKING COUNTERBALANCED CRANK SHAFTS.
APPLICATION FILED NOV. 1, 1916.
1,232,791.  Patented July 10, 1917.
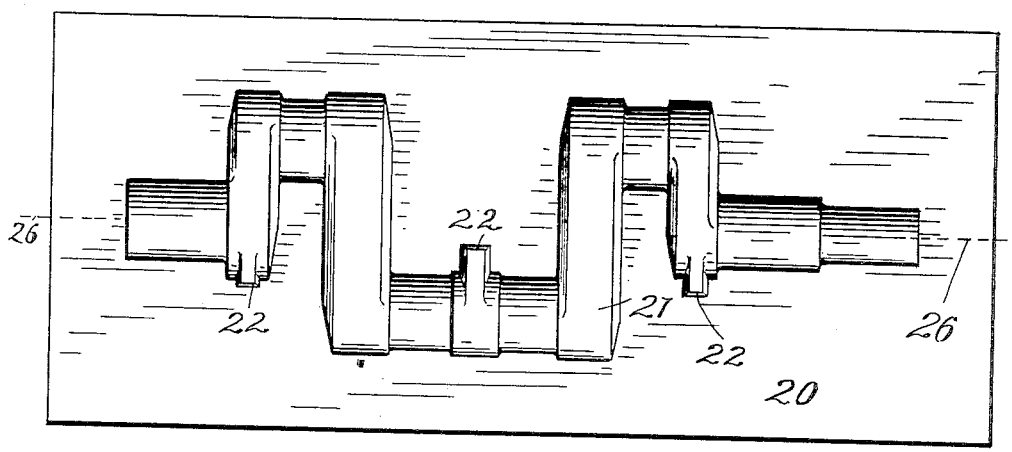
Fig. 2.   Fig. 1.
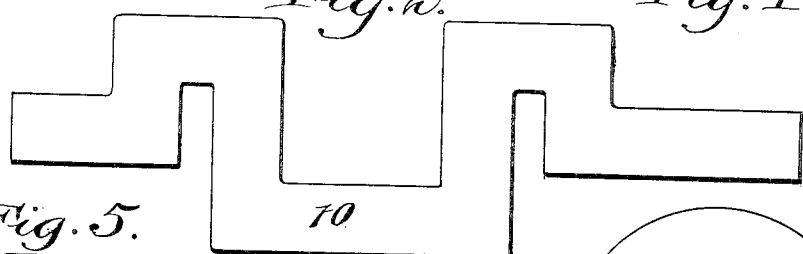
Fig. 5.
Fig. 3.
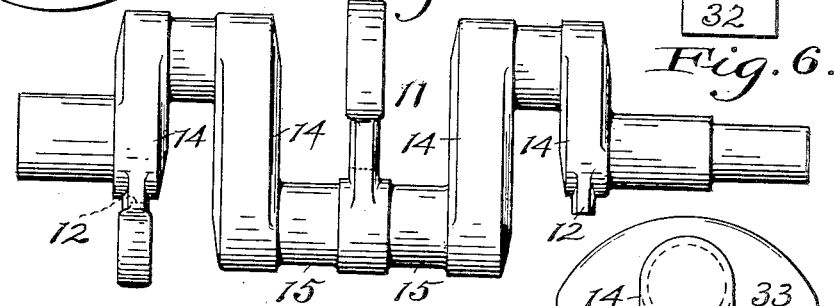
Fig. 6.
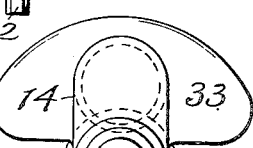
Fig. 7.   Fig. 4.
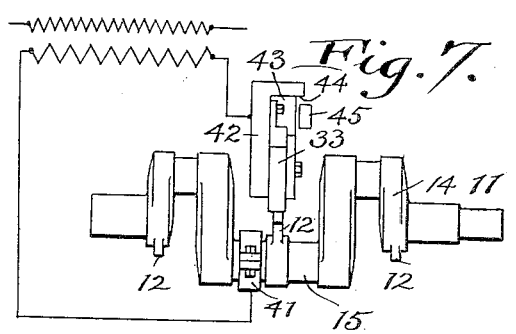
Inventor.
George C. Gordon.
By Thurston & Kwis
attys

UNITED STATES PATENT OFFICE.

GEORGE C. GORDON, OF CLEVELAND, OHIO, ASSIGNOR TO THE PARK DROP FORGE COMPANY, OF CLEVELAND, OHIO, A CORPORATION OF OHIO.

METHOD OF MAKING COUNTERBALANCED CRANK-SHAFTS.

1,232,791.       Specification of Letters Patent.      Patented July 10, 1917.

Application filed November 1, 1916. Serial No. 129,030.

*To all whom it may concern:*

Be it known that I, GEORGE C. GORDON, a citizen of the United States, residing at Cleveland, in the county of Cuyahoga and State of Ohio, have invented a certain new and useful Improvement in Methods of Making Counterbalanced Crank-Shafts, of which the following is a full, clear, and exact description.

The best crank shafts which can be made at a reasonable cost are those which are made of steel by the die-forging process. It has not been possible, however, to produce, by die-forging at a reasonable cost, if at all, a steel crank shaft which is properly counterweighted for high speed. It has been customary, prior to this invention, to bolt on the counterweights; but for various reasons this has not been found satisfactory.

The present invention aims to produce, at a reasonable cost, a die-forged counterweighted crank shaft, whose counterweights are welded on so that they will become in effect parts of the forging, and are properly placed with respect to the off-center weight which they are to counterbalance, whereby the countershaft is rendered particularly suitable for use in a high speed engine.

The invention resides in a crank shaft having the construction defined in the appended claims, and in the process hereinafter described for producing said crank shaft.

In the drawing, Figure 1 is a plan view of one of the pair of dies between which one may forge the forgeable part of the crank shaft shown in Fig. 3, having lugs for the counterweights to be attached to; Fig. 2 is a plan view of the bent bar blank from which said crank shaft may be forged in said dies; Fig. 3 is a plan view of a crank shaft such as may be formed from said blank in said dies and to which two counterweights have been attached; Fig. 4 is an end view of the crank shaft shown in Fig. 3; Fig. 5 is a side view of one of the small counterweights prior to its attachment with the shaft; Fig. 6 is a similar view of the large counterweight which is adapted to be welded to the middle crank shaft lug as shown in Fig. 3; Fig. 7 is a diagrammatic view of an electrical welding machine for butt-welding the lugs of the counterweights to the lugs on the shaft.

In constructing the crank shaft in accordance with this invention, one first heats, and then bends back and forth, a steel bar to produce the blank 10, shown in Fig. 2; which blank is sufficiently near the shape of the crank shaft 11 to be formed, that the dies may shape it between them. This blank is pounded by and between counterpart dies, of which, commonly, one will be fixed and the other movable. The result will be to cause the metal to flow into and fill the die impressions, and therefore come to have the desired shape.

One of the dies 20 which may be used for carrying out this step of the process is shown with an impression 21 which is shaped particularly for constructing the crank shaft shown in Fig. 3. It will be noted that there are in this die three laterally extended impressions 22 which communicate with the main impression 21. Each of these impressions 22 is associated with a part of the die impression in which will be formed off center parts of the crank shaft, and each of said impressions 22 extends from the main die impression in a diametrical direction toward that side of the axis (indicated by 26) of the main die impression which is opposite to that on which are the die impressions for forming certain off center parts of the crank shaft. During the forging operation the metal is changed in shape and caused to fill and take the shape of the main die impression. While doing this, the metal will be caused to flow laterally to an extent sufficient to make it fill these lug impressions 22. The result will be that on the shaft 11, when the die forging has been completed, there will be a plurality of lugs 12, formed in these lug impressions 22; and each of these lugs 12 extends in a diametrical direction, toward the opposite side of the axis 26 of the shaft to that on which lie the off center cheek pieces hereinafter referred to.

33 represents a counterweight. It is more or less nearly sector-shape, and it is provided with a lug 32 which in cross sectional shape and size corresponds with a lug 12. The counterweights are to be permanently connected with the crank shaft, and in proper positions with respect to the off center weights they are to counterbalance by electrically butt-welding a counterweight lug 32 to a crank shaft lug 12.

In Fig. 7, which, as before stated, is a diagrammatic view of a welding machine which may be employed to carry out the last mentioned step of the process, 41 and 42 represent the two electrodes. The crank shaft 11 will be fixedly held in proper position and in contact with the electrode 41. The counterweight 33 will be fixed in contact with the other electrode, with its lug 32 in alinement with the lug 12 on the counterweight, and with their ends adjacent. The electrode 42 should be on a sliding carriage 43 which may be moved by any suitable means to cause the two lugs 12, 32, to come into substantial contact. In a short time the current flow will heat the end portions of these lugs to the welding heat; whereupon, by the movement of the carriage 43 a predetermined distance, by any suitable means, the said lugs will be forced together, thereby slightly shortening them and causing them to weld. The extent of movement of the carriage may be determined by the engagement of the stop lug 44 thereon with a fixed stop 45, or by any other suitable means; but whatever may be the means employed to move the counterweight the definite distance required, the result will be that the counterweight will be permanently attached to the shaft, with its center of weight in the precise position it should be in to effectually counterbalance the off center weight to which it is opposed, and which it is intended to counterbalance.

The invention has been exemplified in the drawing in connection with a two-bearing four-throw crank shaft. But it will be understood that the invention is equally applicable to any crank shaft, however many may be the bearings provided for, and however many may be the crank pins, or however they may be disposed with respect to one another. The particular two-bearing four-throw crank shaft has been selected to exemplify the invention because it discloses the fact that the lugs 12 are not required to be in alinement with a cheek 14, and may be found on that off center part of the crank shaft which the subsequently welded on counterweights are to counterbalance.

It will be noted that while two of the lugs 12 are formed on the body of the crank shaft, and in alinement with the off center cheeks 14, which the subsequently attached counterweights are to counterbalance, the third and middle lug 12 is formed on that part of the crank shaft which lies between the two alined middle crank pins 15. But this lug extends in a diametrical direction and toward the opposite side of the crank shaft axis to that on which lies the off-center weight which the middle counterweight is to counterbalance.

Having described my invention, I claim:

1. The method of making counterweighted crank shafts which consists in die forging a crank shaft having a plurality of integral lugs that project from points adjacent the off-center weights to be counterbalanced and toward opposite sides of the shaft to that on which said off-center weights are respectively located, and in then butt-welding to said lugs suitable counterweights of such shape and size that their centers of weight lie respectively in the same diametrical planes as the center of weight of the off-center weights to be counterbalanced thereby and on opposite sides of the axis of the shaft.

2. The method of making die forged steel counterbalanced crank shafts which consists (1) in bending a steel bar into approximately the desired shape to form a blank for dies to act upon; (2) in forging said blank between dies having suitably shaped main impressions and having also laterally extended lug impressions which communicate with the main impressions whereby the metal will be caused to flow laterally into and fill said lug impressions as it is being forced to fill the main die impressions, and (3) in subsequently connecting counterweights to the lugs so formed on said shaft.

3. The method of making die forged steel counterbalanced crank shafts which consists (1) in bending a steel bar into approximately the desired shape to form a blank for dies to act upon, (2) in forging said blank between dies having suitably shaped main impressions and having also laterally extended lug impressions which communicate with the main recesses whereby the metal will be caused to flow laterally into and fill said lug impressions as it is being forced to fill the main die impressions; and (3) in subsequently electrically welding counterweights to the ends of the several lugs so formed on said crank shaft.

In testimony whereof, I hereunto affix my signature.

GEORGE C. GORDON.